Figure 3:
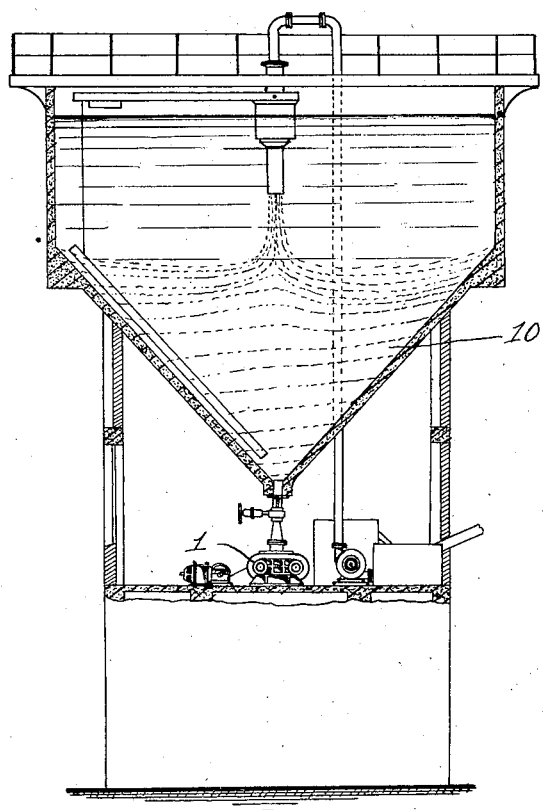

Dec. 17, 1935.  R. A. HENRY  2,024,358
FILTRATION OF SLIMES
Filed April 17, 1933   2 Sheets-Sheet 1
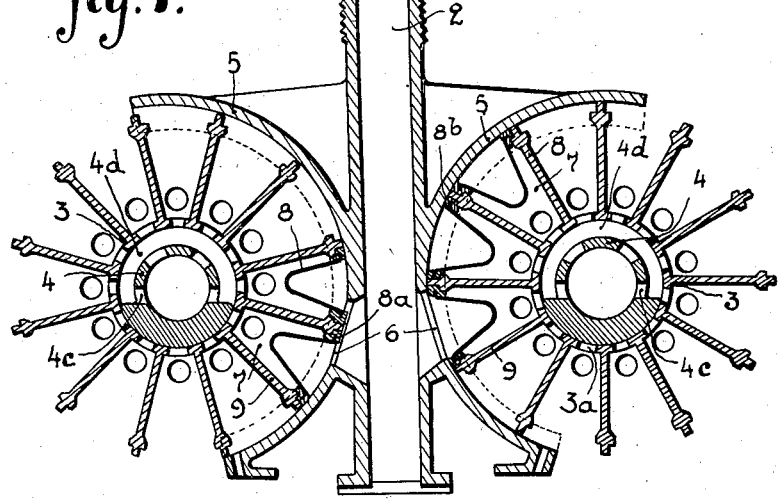
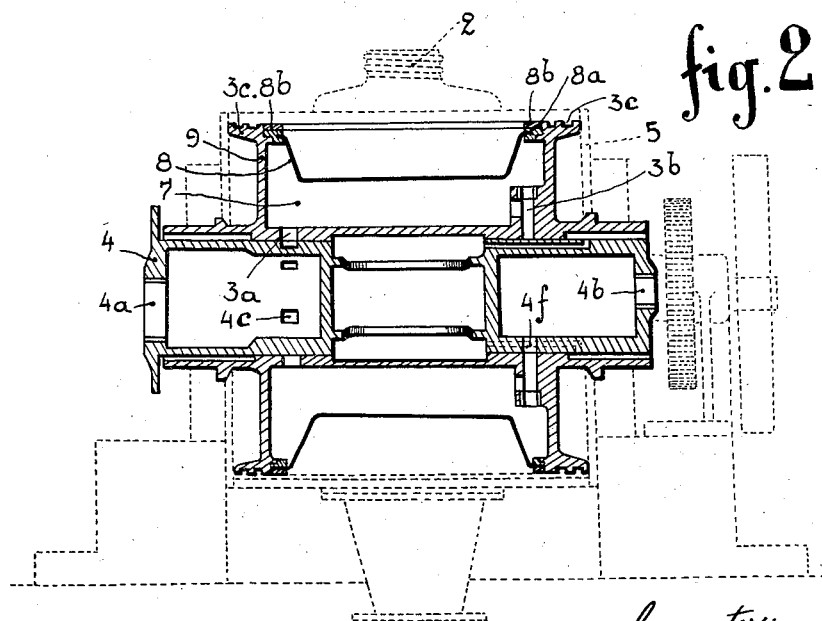

Patented Dec. 17, 1935

2,024,358

UNITED STATES PATENT OFFICE 2,024,358

FILTRATION OF SLIMES

René Auguste Henry, Brussels, Belgium

Application April 17, 1933, Serial No. 666,613
In Belgium June 24, 1932

4 Claims. (Cl. 210—199)

This invention relates to the filtration of slimes containing mineral or organic matter in the form of suspensions or emulsions and particularly slime from coal washing, flotation of ores, wool washing, sewage etc.

In carrying out the filtration of slimes it has already been proposed to use revolving drums the circumference of which is formed by a filter cloth or lattice work and inside which the pressure is reduced, the surface of the drum passing through a vat containing the slime to be filtered so that it retains a certain layer of slime under the action of the suction, this layer being removed by scraping at the end of the rotation of the drum.

The capacity of production of these filters is small compared with their bulk owing to the slight thickness of the layer of substance on the filter and their efficiency is greatly affected by variations of the degree of concentration of the suspended matter filtered.

It has, however, been proposed, with a view to increasing the efficiency of these filters, to provide partitions on the circumference of the drum so as to form buckets the bottoms of which are formed by the filtering surface of metallic gauze or lattice work.

Although the yield may thus be improved, it is possible to increase this yield further to a considerable degree and one object of the present invention is to secure this.

For this purpose in a plant of the above type the filtering surface forming the periphery of the drum is provided with pockets in which the slime to be filtered is held during a part of the rotation of the drum and it is then expelled from these pockets by the action of compressed air. The whole surface of each pocket thus takes part in the filtering action and enables quicker filtration to be obtained than when only the bottom of the pocket is perforated.

To avoid having to alter or replace the entire filtering surface to adapt it to the material treated, or in the case when this surface is partially damaged, the arrangement according to the invention consists of a plurality of juxtaposed filtering buckets, forming pockets, the whole surface of which is able to act, and which cover cavities subjected to the action of a vacuum and compressed air.

In order to accelerate filtration the slime is, according to a further feature of the invention conveyed under pressure into the filtering buckets, the said pressure being preferably obtained by hydrostatic pressure of the slimy fluid contained in a tank below which the filtering machine is placed.

This pressure is maintained by a fixed cylindrical case or cover between two adjacent filtering drums which covers a part of the circumference of each drum, the two drums being situated one on either side of the slime intake so as to maintain the pressure at which the slime is introduced.

The form and depth of the buckets are made to suit the kind of slime treated so as to obtain the best thickness for the passage of air and a minimum adhesion of the caked matter to the filtering sides.

It is to be noted that an alternate filling of the buckets would cause water hammering which is an advantage from the point of view of the expulsion of water from the slime, but to limit the hydraulic pressure, due to velocity, to degrees compatible with the mechanical resistance of the filter, two rotary drums are used revolving on parallel axes and fed from the same supply of slime under pressure, the displacement of these drums being for one half the filling phase.

The accompanying drawings show, by way of example, a method of application of the invention.

In the drawings Fig. 1 is a longitudinal section of a filtering machine according to the invention, while, Fig. 2 is a section through the axis of one of the drums.

Fig. 3 is a view, partly in section and partly in elevation, indicating schematically one part of the installation.

The machine 1 according to the invention communicates by the intake passage 2 with the lower part of a tank 10 where the slime from the treatment of sludge water is about to precipitate.

This machine consists essentially of two drums 3 each rotating round a distributor 4. These two drums are connected by toothed gearing driven by the same motor and revolved in opposite directions. The two drums are enclosed in the same casing 5 covering about half their circumference and provided with two supply ports 6 through which the slime passes from passage 2 to the drums. As regards the two ports 6, the two drums are displaced by half the angle of one of their cavities 7 and each of these cavities is closed at its outer end with removable filter buckets 8 consisting of a thick wire gauze on which a fine gauze is fixed by soldering. The combination is held by a frame 8a in which the edges of the two gauzes are embedded. This frame is fixed on the lugs 9 of the cavities by a frame 8b and bolts. The shape of these cavities 7 depends on the kind of slime to be treated.

The fixed distributor 4 around which the drum rotates is brought into communication by its opening 4a with a source of reduced pressure and an opening 4b with a source of compressed air. On the reduced pressure side it is perforated with two orifices 4c communicating with the bottom of an annular channel 4d extending over the upper part of the circumference of the distributor. This channel 4d communicates with holes 3a, made in the bottoms of the cavities. On the compressed air side there is a single opening 4f which communicates with holes 3b also made in the bottoms of the cavities.

During the filtering operation the slime in the passage 2 is conveyed under pressure through the ports 6 into the filtering buckets, the pressure of the injected slimes being maintained due to the provision of the casing 5; this introductory pressure corresponds to the static pressure created by the height of the liquid in the conduit 2 and in the reservoir 10; after the filling of several filtering pockets the arrest of the discharge of the liquid slime in the conduit 2 causes a momentary increase of the pressure due to the effect of water hammering. Suction acts under the buckets during the whole of their motion round the upper part of the drum. When a filter bucket has slightly passed the intake port 6, it remains momentarily closed by the tight casing 5; during this time a part of the liquid contained in the bucket is aspirated by the opening 3a until the pressure in the interior of the bucket is reduced to a value approaching that maintained in the aspirator; accordingly, when the bucket then commences to be exposed to the atmosphere due to the outward flare of the casing, air is sucked into the pocket and aerates the material retained therein. The speed of rotation is regulated so that these slimes will reach the lower part of the drum in a sufficiently dry state. On reaching the lower part of the drum the cavities are momentarily brought into communication with the source of compressed air and this expels the caked substances from the filter surfaces in the cavities. The bottom of each cavity is inclined longitudinally towards the suction end of the drum to facilitate the flow of the water from filtration.

Water tight grooves 3c are made between the side of the drum and inner surface of the case.

What I claim is:

1. A dewatering machine for liquid slimes, comprising a rotary drum having substantially radially and inwardly extending partitions forming chambers therebetween; filtering pockets disposed at the circumference of the drum and each closing one of the chambers, the concave face of said pockets being disposed towards the exterior of the drum; a supply duct for introduction of the liquid to be treated; a fixed arcuate member, provided with an intake port connected with said supply duct, and extending circumferentially behind and before said port through a distance corresponding to a plurality of chambers, and tightly contacting with the peripheral portions of the chambers in order to seal them off; means for impressing a vacuum on the interior of the chambers during a part of the rotation of the drum from the intake port onward; and means for expelling the treated slime during another part of rotation of the drum.

2. A dewatering plant for slimy liquid including a dewatering machine according to claim 1, a tank containing the liquid to be treated disposed above the dewatering machine, and a duct tightly connecting the base of said tank with the supply duct of the dewatering machine so as to force slime under pressure into the filtering pockets of the machine.

3. A dewatering machine for liquid slimes, comprising a rotary drum having substantially radially and inwardly extending partitions forming chambers therebetween; a plurality of filtering pockets; means for removably fixing said filtering pockets at the edges of the radial partitions, said pockets, adapted to close said chambers, having their concave faces disposed towards the exterior of the drum; a supply duct for introducing the liquid to be treated; a fixed arcuate member provided with an intake port connected with said supply duct, and extending circumferentially behind and before said port through a distance corresponding to a plurality of chambers, and tightly contacting with the peripheral portions of the chambers in order to seal them off; means for impressing a vacuum on the interior of the chambers during a part of the rotation of the drum from the intake port onward; and means for expelling the treated slime during another part of rotation of the drum.

4. A dewatering machine for liquid slimes, comprising two dewatering machines as claimed in claim 1 associated with a common supply duct tightly connected with the respective intake ports of said two machines; and means for rotating the two drums at the same speed; the angular position of the drums of the two associated machines about their axes of rotation being staggered with respect to their intake ports through an angle which is substantially one-half of that defined by a chamber.

RENÉ AUGUSTE HENRY.